(12) United States Patent
Sammells

(10) Patent No.: US 6,793,711 B1
(45) Date of Patent: Sep. 21, 2004

(54) MIXED CONDUCTING MEMBRANE FOR CARBON DIOXIDE SEPARATION AND PARTIAL OXIDATION REACTIONS

(75) Inventor: Anthony F. Sammells, Boulder, CO (US)

(73) Assignee: Eltron Research, Inc., Boulder, CO (US)

( * ) Notice: Subject to any disclaimer, the term of this patent is extended or adjusted under 35 U.S.C. 154(b) by 608 days.

(21) Appl. No.: 09/724,131

(22) Filed: Nov. 28, 2000

Related U.S. Application Data

(60) Provisional application No. 60/169,500, filed on Dec. 7, 1999.

(51) Int. Cl.[7] .............................................. B01D 53/22
(52) U.S. Cl. .................. 95/48; 95/46; 210/500.25; 210/510.1; 210/502.1; 429/103; 585/818; 204/400
(58) Field of Search ................. 210/500.25, 500.26, 210/510.1, 502.1; 55/524, 523; 585/818, 906; 204/130, 400; 428/220; 429/324, 103; 45/48, 46

(56) References Cited

U.S. PATENT DOCUMENTS

| | | | |
|---|---|---|---|
| 206,884 A | * | 8/1878 | Landis |
| 3,616,336 A | * | 10/1971 | Childs et al. ............... 205/350 |
| 3,865,924 A | | 2/1975 | Gidaspow et al. .......... 423/230 |
| 4,079,171 A | | 3/1978 | Marianowski et al. ........ 429/46 |
| 4,410,607 A | | 10/1983 | Arons et al. .................. 429/40 |
| 4,480,017 A | | 10/1984 | Takeuchi et al. .............. 429/13 |
| 4,661,422 A | | 4/1987 | Marianowski et al. ........ 429/13 |
| 4,738,760 A | | 4/1988 | Marianowski et al. ...... 204/130 |
| 4,761,164 A | | 8/1988 | Pez et al. ....................... 55/16 |
| 4,791,079 A | | 12/1988 | Hazbun .......................... 502/4 |
| 4,793,004 A | | 12/1988 | Long et al. ..................... 2/49 |
| 4,827,071 A | | 5/1989 | Hazbun ...................... 585/443 |
| 4,859,296 A | | 8/1989 | Marianowski et al. ...... 204/129 |
| 5,075,277 A | | 12/1991 | Saiai et al. ................... 502/334 |
| 5,094,895 A | * | 3/1992 | Branca et al. ........... 428/36.91 |
| 5,229,102 A | | 7/1993 | Minet et al. ................. 423/652 |
| 5,306,411 A | | 4/1994 | Mazanec et al. ............ 204/265 |
| 5,354,627 A | | 10/1994 | Hatoh et al. .................. 429/40 |

(List continued on next page.)

FOREIGN PATENT DOCUMENTS

WO    WO98/23051    5/1998

OTHER PUBLICATIONS

Abudula et al. (1996), "Oxidation mechanism and effective anode thickness of SOFC for dry methane fuel," *Solid State Ionics* 86–88:1203–1209.

(List continued on next page.)

*Primary Examiner*—Ana Fortuna
(74) *Attorney, Agent, or Firm*—Greenlee, Winner and Sullivan, P.C.

(57) ABSTRACT

Gas-impermeable membranes containing a molten salt electrolyte in an electron-conducting matrix provide for mixed ion and electron conduction across the membrane. The membranes mediate transport of a selected ion for gas separation and or catalytic reactions at the membrane surface. The membranes are useful in catalytic membrane reactors, particularly for gas separation and full or partial oxidation reactions. The membranes are of particular interest for mediation of oxide ions, such as carbonate, for carbon dioxide separation or for partial oxidation reactions. Catalytic membrane reactors can incorporate catalyst layers on the membrane surfaces and or three-dimension catalysts, e.g., packed-bed catalysts, in the oxidation zone or the reduction zone of the reactor. The invention also relates to methods of gas separation and method for generating products employing the membranes and catalytic membrane reactors of this invention. Membranes and reactors of this invention that incorporate a molten carbonate salt are of particular use in the production of synthesis gas.

66 Claims, 8 Drawing Sheets

U.S. PATENT DOCUMENTS

| | | | | |
|---|---|---|---|---|
| 5,380,600 | A | | 1/1995 | Hansen et al. ................. 429/17 |
| 5,580,497 | A | | 12/1996 | Balachandran et al. ...... 252/519 |
| 5,595,832 | A | | 1/1997 | Tomimatsu et al. ............ 429/16 |
| 5,618,405 | A | | 4/1997 | Winnick ..................... 205/763 |
| 5,622,790 | A | | 4/1997 | Dicks et al. .................. 429/16 |
| 5,712,220 | A | | 1/1998 | Carolan et al. ............. 502/400 |
| 5,723,074 | A | | 3/1998 | Balachandran et al. ...... 252/519 |
| 5,817,597 | A | | 10/1998 | Carolan et al. ............. 502/400 |
| 5,869,203 | A | | 2/1999 | Huang et al. ................. 429/46 |
| 5,888,272 | A | | 3/1999 | Prasad et al. ................... 95/54 |
| 5,897,972 | A | | 4/1999 | Hosaka ......................... 429/46 |
| 5,900,031 | A | | 5/1999 | Bloomfield .................. 48/197 |
| 5,928,489 | A | | 7/1999 | Winnick ..................... 205/618 |
| 5,983,488 | A | | 11/1999 | Erickson et al. ............... 29/731 |
| 5,989,740 | A | | 11/1999 | Tomimatsu et al. ........... 429/16 |
| 6,033,632 | A | | 3/2000 | Schwartz et al. ............ 422/190 |
| 6,090,312 | A | | 7/2000 | Ziaka et al. .................. 252/373 |
| 6,355,093 | B1 | * | 3/2002 | Schwartz et al. ............... 95/56 |
| 6,514,394 | B1 | * | 2/2003 | Vangrunderbeek et al. . 204/400 |

OTHER PUBLICATIONS

Ang, P.G.P. and Sammells, A.F., (Jun. 1980), "Influence of Electrolyte Composition on Electrode Kinetics in the Molten Carbonate Fuel Cell," *J. Electrochem. Soc.* 127:1287–1294.

Berger et al. (1996), "Nickel catalysts for internal reforming in molten carbonate fuel cells," *Appl. Catalysis A: General* 143:343–365.

Biedenkopf et al. (1998), "The corrosion behaviour of iron and chromium in molten $(Li_{0.62}K_{0.38})_2CO_3$," *Electrochimica Acta* 44:683–692.

Lagergren, C. and Lindbergh, G. (1998), "Experimental determination of effective conductivities in porous molten carbonate fuel cell electrodes," *Electrochimica Acta* 44:503–511.

Murai et al. (Aug. 1996), "Deformation Mechanism of Porous Nickel Oxide in Molten Li/K Carbonates," *J. Electrochem. Soc.* 143:2481–2486.

Murai et al. (Sep. 1996), "Crystal Growth of γ–Lithium Aluminate in Molten Li/K Carbonates," *J. Electrochem. Soc.* 143:2776–2783.

Murai et al. (Nov. 1996), "Lithiation of Alumina in Molten Li/K Carbonates," *J. Electrochem. Soc.* 143:3456–3462.

Otoshi et al. (May 1991), "Changes in the Phases and Electrical Conduction Properties of $(La_{1-x}Sr_x)_{1-y}MnO_{3-\delta}$," *J. Electrochem. Soc.* 138:1519.

Passalacqua et al. (Nov. 1996) "Porous ceramic membranes for direct internal reforming molten carbonate fuel cells," *Material Letts.* 29:177–183.

Prins–Jansen et al. (1996), "An ac–Impedance Study of Dense and Porous Electrodes in Molten–Carbonate Fuel Cells," *Electrochimica Acta* 41:1323–1329.

Sammells et al. (Feb. 1980), "Development of Sulfur–Tolerant Components for the Molten Carbonate Fuel Cell," *J. Electrochem. Soc.* 127:350–357.

* cited by examiner

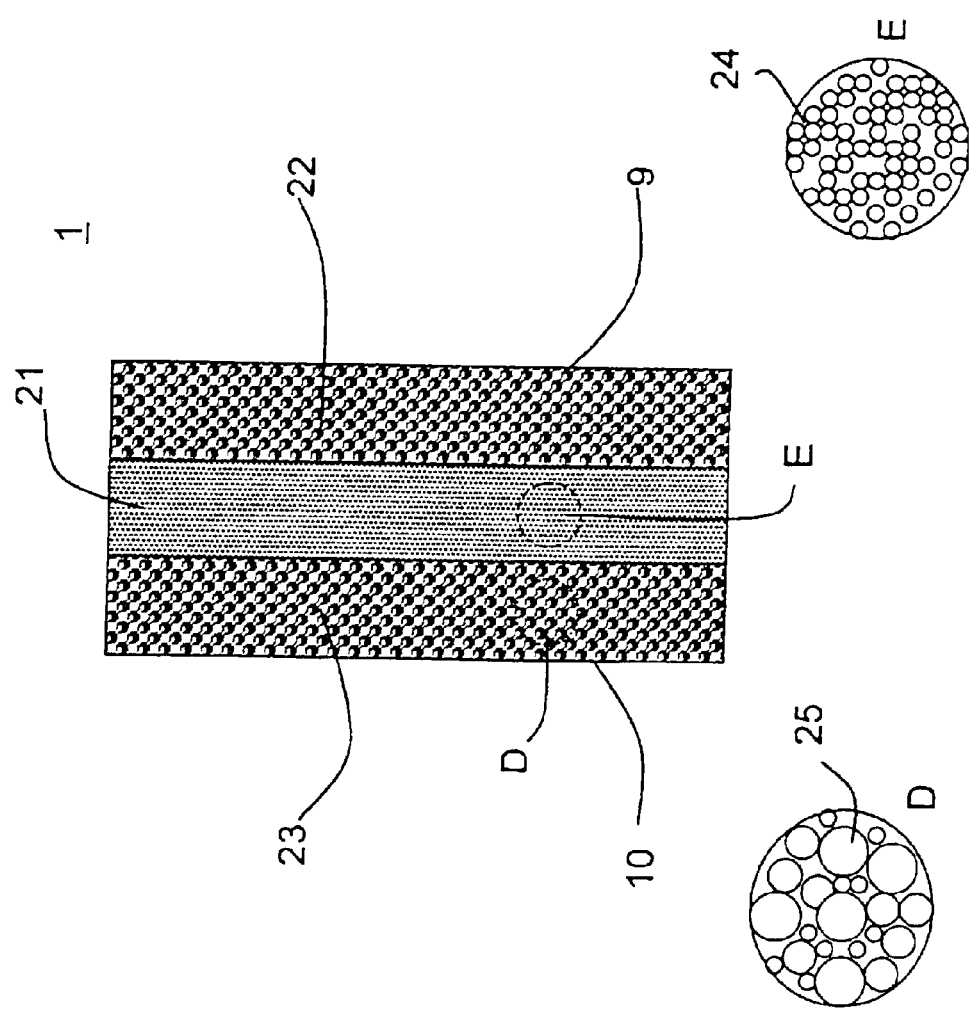

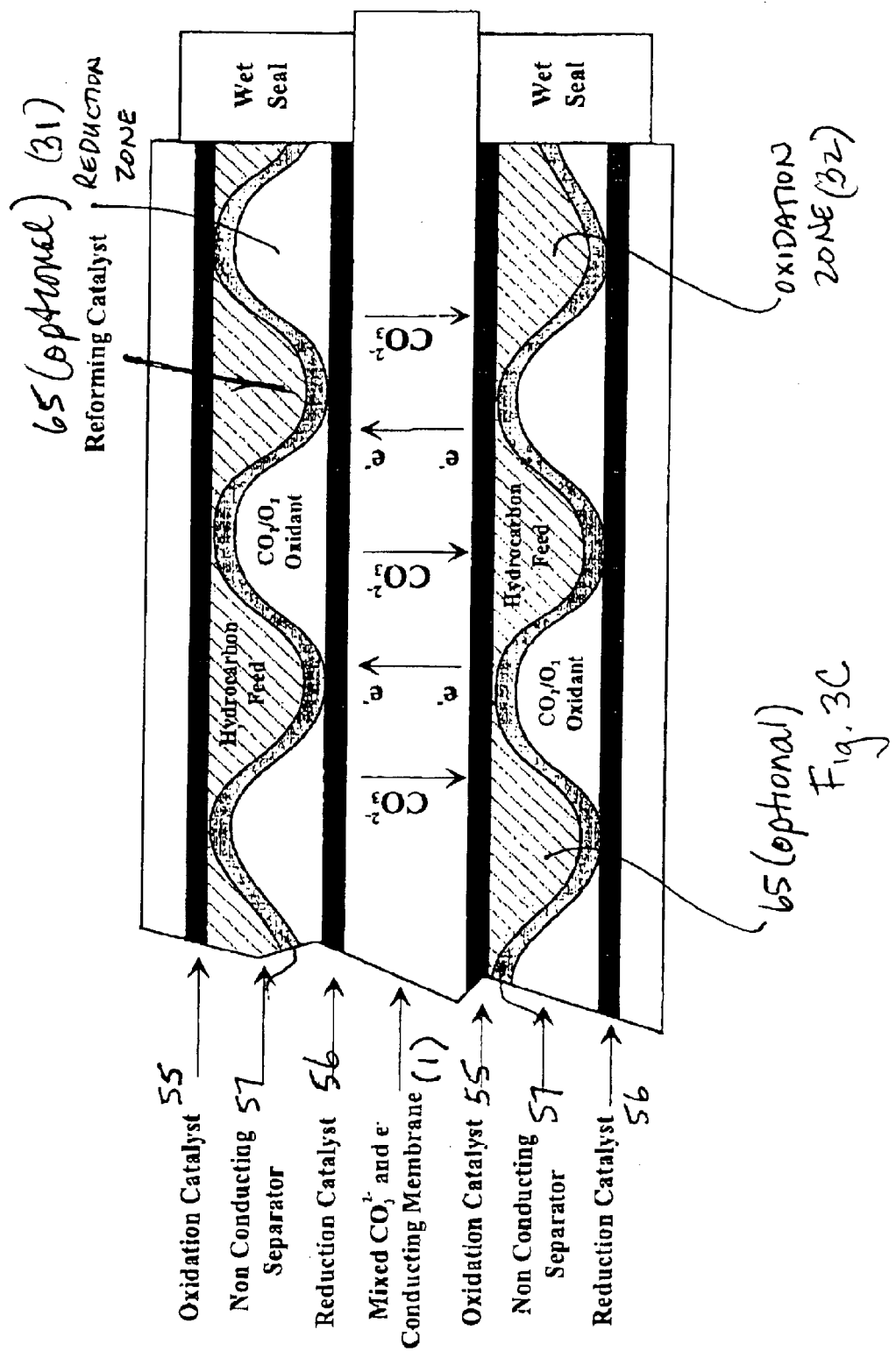

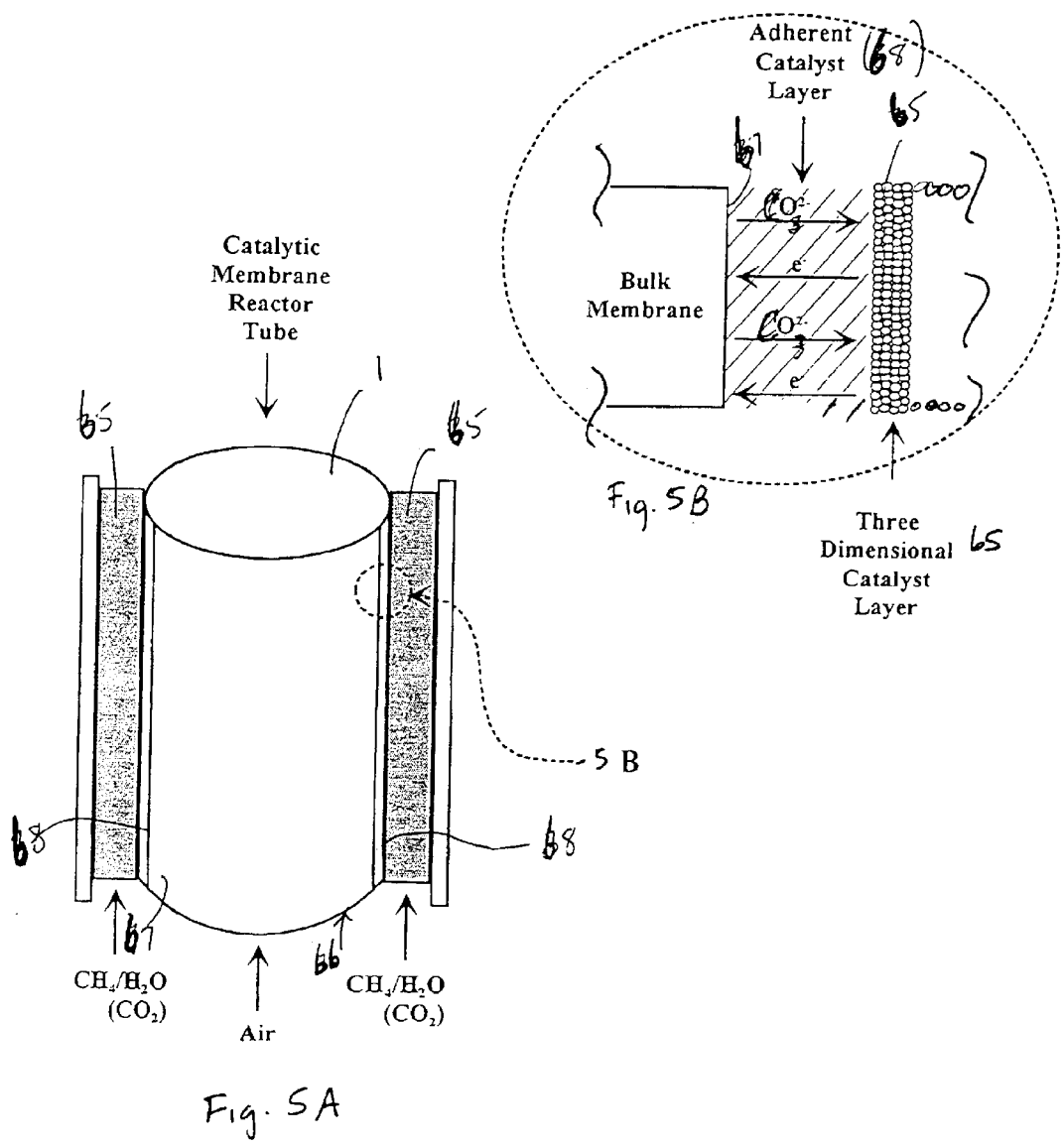

MIXED CONDUCTING MEMBRANE FOR CARBON DIOXIDE SEPARATION AND PARTIAL OXIDATION REACTIONS

CROSS-REFERENCE TO RELATED APPLICATIONS

This application takes priority under 35 U.S.C.§ 119(e) from U.S. provisional application 60/169,500, filed Dec. 7, 1999 which application is incorporated by reference herein in its entirety to the extent that it is not inconsistent with the disclosure herein

BACKGROUND OF THE INVENTION

Molten salt electrolytes are employed for ion transport in fuel cells for the generation of electricity. See, for example, U.S. Pat. Nos. 4,480,017, 4,410,607 and 4,079,171. Molten carbonate electrolytes have been used extensively in fuel cell applications. See, for example, U.S. Pat. Nos. 5,354,627 and 5,989,740. Molten salt fuel cells can be supplied with reformed fuel gas from an external reformer system. Alternatively, molten salt fuel cells can incorporate an internal reforming catalyst, i.e., a steam reforming catalyst, to produce hydrogen-containing gas (e.g. synthesis gasp for use at the gas electrode side of the fuel cell for generation of electricity. See, for example, U.S. Pat. Nos. 5,075,277; 5,380,600; 5,622,790; and 6,090,312 for internal reforming fuel cells.

Molten salt electrolytes have also been employed in electrochemical cells for gas separation, e.g., for the separation of oxygen, via transport of oxygen-containing anions through the molten salt. See, U.S. Pat. No. 4,859,296. More specifically, molten nitrate salt electrolyte has been employed in an electrochemical cell for oxygen separation via transport of nitrate ion (U.S. Pat. No. 4,738,760).

Molten chloride salt electrolytes (lithium chloride and potassium chloride) have been employed in electrochemical cells for the recovery of chlorine from hydrogen chloride gas. See, Yoshizawa, S. Et al. (1971) J. Appl. Electrochem. 245–251. U.S. Pat. Nos. 5,618,405 and 5,928,489 report the removal and recovery of hydrogen halides from gas mixtures using molten halide salt electrolytes.

In electrochemical and fuel cells employing molten salt electrolytes, a porous electrolyte plate (or tile) is made from a porous non-conducting matrix impregnated with the molten salt and positioned between an anode and a cathode. The porous matrix is typically made of a refractory, non-electron-conducting, inorganic material, such as lithium aluminate or lithium titanate. The electrolyte plate conducts or mediates ions between the anode and the cathode via the molten salt. The molten salt is selected for transport or mediation of a desired ion, e.g., a carbonate salt is used for mediation of a carbonate anion or a chloride salt is used for transport of chloride ion. The molten salt electrolyte plate does not conduct electrons. The anode and cathode of the electrochemical or fuel cells are electrically connected through an external circuit for electron transport.

Catalytic membrane reactors using gas-impermeable solid state membranes for the oxidation or decomposition of various chemical species have been extensively studied. One potentially valuable use of such reactors is in the production of synthesis gas. See, for example, Cable et al. EP patent application 90305684.4 (published Nov. 28, 1990) and Mazanec et al. U.S. Pat. No. 5,306,411. Synthesis gas, a mixture of CO and $H_2$, is widely used as a feedstock in the chemical industry for production of bulk chemicals such as methanol and liquid fuel oxygenates.

Catalytic membrane reactors can also be employed for steam reforming of hydrocarbons. Steam reforming involves the following reactions illustrated with methane as the hydrocarbon:

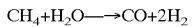

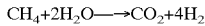

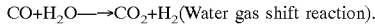

U.S. Pat. No. 5,229,102 reports the production of $CO_2$, and $H_2$ by steam reforming of a hydrocarbon in a catalytic ceramic membrane reformer. In the membrane reactor, $H_2$ and $CO_2$ are generated by passing hydrocarbon and steam into the reactor zone in contact with a steam reforming catalyst, e.g., Ni metal promoted with alkali metal. Hydrogen is removed by permeation (or diffusion) through the membrane increasing the efficiency of the reaction.

Catalytic membrane reactors employing gas-impermeable, ion conducting membranes can, for example, be used for oxidation/reduction reactions. For example, oxygen or an oxygen-containing species (such as NOx or SOx) can be reduced at the reduction surface of a catalytic membrane to oxygen-containing anions which are transported across the membrane to an oxidation surface where they react to oxidize a selected reduced species. Materials used in the membranes in such a reactor conduct oxygen-containing anions. Provision must be made in such reactors for electron conduction to maintain charge neutrality permitting anion conduction through the membrane. Electron conduction has been achieved by the use of external circuits for current flow (U.S. Pat. No. 4,793,004). Electron conductivity has also been achieved by doping oxygen-anion conducting ceramic materials with metal ions to generate a material that conducts electrons and oxygen anions. See, U.S. Pat. Nos. 4,791,079 and 4,827,071.

Alternatively, mixed-conducting composite materials can also be made by mixing an oxygen aniononducting material and an electronically-conducting material to form a multiple phase material that conducts both electrons and anions. A preferred method for obtaining mixed- (or dual-) conducting catalytic membranes is to use a membrane material that inherently conducts both electrons and ions. For example, a number of mixed metal oxide materials can be formed into gas impermeable mixed conducting membranes. See, for example, U.S. Pat. No. 6,033,632 and references cited therein.

The present invention relates to gas-impermeable mixed conducting membranes for use in a variety of catalytic membrane reactions and gas separation applications, which are formed by impregnating a porous electron-conducting matrix with a molten salt electrolyte. Ions mediated through these membranes facilitate gas separation and/or provide reactive species for the generation of desired value-added products in catalytic membrane reactors.

SUMMARY OF THE INVENTION

This invention relates to mixed-conducting membranes, i.e., membranes that conduct both ions and electrons, which behave as short-circuited electrochemical cells. The membrane comprises a porous electron-conducting matrix and a molten salt that conducts ions. The electron-conducting matrix is at least in part impregnated with molten salt to provide for ion transport through the membrane. The membrane comprises two external surfaces for contact, respectively, with reagent gas and reactant gas. Ions are transported from one external surface to the other external surface of the membrane. One or both of the external surfaces of the membrane can be catalytic. The external surfaces can be provided with adherent catalyst layers, or a three-dimensional catalyst can be provided in close proximity to one or both of the external membrane surfaces. Ions to be transported are formed at or near one external surface of the membrane in contact with reagent gas, transported through the membrane and released at the other external surface where they may react with reactant gas in contact with that surface.

In specific embodiments, one external surface of the membrane is an oxidizing surface and the other external surface is a reducing surface. The reducing surface is typically contacted with an oxidized or oxygen-containing gas. The oxidizing surface is typically contacted with a reduced gas.

Of particular interest are membranes in which the molten salt conducts certain oxide ions, particularly carbonate ion ($CO_3^{2-}$). The membranes of this invention are useful generally for production of value-added products using reactive ions that are mediated through the membrane as reagents to convert lower-value starting materials (e.g., hydrocarbons). The membranes of this invention are also useful for the separation of gases and are of particular use for the separation of carbon dioxide from gas mixtures.

More specifically, the membranes of this invention are useful for the generation of carbonate ion from carbon dioxide- and oxygen-containing gas mixtures. The carbonate ion generated and mediated through the membrane is, in turn, useful as a reagent ion for reaction with reactant gases to produce desired products and particularly for partial oxidation of reduced gases. Carbonate ion can be used for the partial oxidation of a variety of chemical species, including hydrocarbons. Using membranes of this invention, carbon dioxide can be removed from gas mixtures containing carbon dioxide and oxygen, particularly air, by reaction of carbon dioxide and oxygen to give carbonate ion at the membrane reducing surface. The carbonate ion produced is then transported through the membrane to the membrane oxidizing surface.

In a specific embodiment, the carbonate ion generated is used to react with natural gas (methane), other hydrocarbons and mixtures of hydrocarbons (optionally in the presence of steam) to form the liquid fuel precursor synthesis gas (syngas, $CO+H_2$) or mixtures of $CO_2$, CO and $H_2$.

Mixed-conducting membranes of this invention in which the molten salt conducts any anion or cation are of general interest. Membranes impregnated with a molten salt that conducts any reactive ion, either anion or cation, are particularly useful in membrane reactors. Membranes of this invention that conduct halide, nitrate, sulfate, or phosphate anions and those that conduct various cations, such as ammonium ion ($H_4^+$), are of particular interest for use in membrane reactors and in gas separation processes.

The mixed-conducting membranes of this invention are substantially gas-impermeable membranes formed from a porous electron-conducting matrix which is at least partially impregnated with an ionically-conducting molten salt which functions as an electrolyte to conduct certain ions. Sufficient molten salt is present in the porous electron-conducting matrix to provide for ion conduction through the membrane. In a specific embodiment, the electron-conducting matrix has a central region of fine porosity and external catalytic regions of coarser porosity on either side of this central region. The porosity of the electron-conducting matrix in the central region is sufficiently fine (or small) to substantially retain the molten salt in that region and to substantially fill pores in that region. The porosity of the membrane in the external (or outer layer) catalytic regions is sufficiently increased over that of the central membrane region so that pores in the external regions can be only partially impregnated with molten salt to establish and maintain a three phase interface of gas phase reactants (e.g., $CO_2$ and $O_2$), molten salt electrolyte (e.g., molten carbonate salt), and electrons (from the electron-conducting matrix) to allow reaction to proceed (See: Prins-Jansen et al. (1996) J. Electrochem. Soc. 143: 1617–1628).

Pore size in the central layer of the electron-conducting matrix is typically on average less than about 1 micron and is preferably on average less than about 0.5 micron. Pore size in the external catalytic regions of the membrane is typically on average greater than about 1 micron and is preferably on average about 2–10 micron. The pores in the external regions of the membrane may have a bimodal distribution of sizes with the majority (greater than about 50%) of the pores sufficiently coarse that molten salt is not retained therein and with a minority (less than about 50%) of the pores sufficiently fine that molten salt is retained therein. In a preferred embodiment, up to about one-third of the pores in the external regions of the membrane are sufficiently fine in size to retain molten salt. The fine pores in the external regions of the membrane may be distributed non-uniformly with a higher amount of finer pores located in proximity to the central fine porosity region of the membrane. The membrane may, for example, be formed from a monolithic electron-conducting matrix having varying porosity with a central fine pore region, an intermediate region having a mixture of fine and coarse pores and an outer catalytic coarse pore region. Alternatively, the membrane may be formed from multiple layers of different porosity to achieve the desired pore size distribution and/or may be formed from layers of different electron-conducting materials of different porosity.

In a specific embodiment, the external regions of the porous membrane function to provide sites for catalytic oxidation and reduction reactions. One external catalytic region can provide a reducing surface when in contact with a gas containing carbon dioxide and oxygen (or other ion source gases) and the other (opposite) external catalytic region can form an oxidizing surface to which ions formed at the reducing surface are transported through the membrane. Reactions of anions, e.g., oxide anions, mediated through the membrane can occur at the oxidizing surface. For example, partial oxidation reactions effected by carbonate can occur at the oxidizing surface of the membrane when it is in contact with a gas containing a reactant gas or a reduced gas (e.g., methane or various hydrocarbons). Reactions of cations, e.g., ammonium ion, mediated through the membrane can occur at the reduction surface. For example, ammonium ion can be generated at the reduction surface of a membrane with concomitant reduction of a reactant gas, e.g. hydrogenation of a reactant gas.

The porous electron-conducting matrix of the membrane can be formed from various metals or from electron-conductive ceramics, such as lithium strontium manganate (LSM). Ceramic materials which conduct electrons, but exhibit little or no ion conduction at operating temperature of the membrane are preferred. Various electron-conducting ceramics suitable for use as matrices in the membranes of this invention are known in the art and are readily available.

The membranes of this invention conduct electrons and do not require external circuits to maintain charge neutrality when ions are mediated across the membrane. Thus, membranes of this invention do not require collector plates or similar electron-conducting elements that are employed in molten salt, electrochemical and fuel cells.

Metals useful for forming the electrolyte matrix are transition metals or mixtures thereof. Preferred metals for the porous matrix are nickel and mixtures of nickel with other transition metals. A preferred metal mixture is a mixture of nickel and chromium. Regions of the porous metal matrix of the membrane may react with components of the molten salt or gas components during operation (e.g., during exposure to reactant or reagent gases). For example, regions of the metal matrix in contact with oxygen (or air) may be converted into metal oxide and portions of the metal matrix may react with the molten salt, e.g., the metal matrix may become lithiated when Li molten salts are employed. Matrix material can be formed into a variety of shapes including disks, plates, rings, or tubes (e.g., open-ended tubes or those having one closed end).

Molten salt electrolytes are selected for transport of a selected ion, e.g., molten carbonate salts are employed for carbonate ion transport. Membranes of this invention can be selected for transport of either anions, such as $CO_3^{2-}$, or cations, such as $NH_4^+$. The molten carbonate used in membranes of this invention is preferably a carbonate of an alkali metal or a mixture of alkali metal carbonates. More preferred molten carbonates are lithium carbonates, sodium carbonates, potassium carbonates or mixtures thereof. Molten halides can be employed for halide ion mediation, e.g., alkaline halides, such as lithium halide or potassium halide or alkaline metal halides, such as lithium aluminum halides. Molten sulfate salts and nitrate salts can be used for sulfate and nitrate ion mediation, respectively. Molten phosphate salts can be used for phosphate ion mediation. Molten ammonium salts can be employed for ammonium cation mediation. Preferred molten salts for use in the membranes of this invention have melting points below about 500° C.

Gas-impermeable membranes of this invention can optionally be provided with adherent catalyst layers at either or both external surfaces to promote desired reactions. For example, adherent catalyst layers can be provided at the oxidation surface, the reduction surface or both to facilitate desired reactions. For applications to partial oxidation by oxide ions, an oxidation catalyst layer can be provided on the oxidation surface of the membrane. Particularly in applications to synthesis gas production at the oxidation surface of membranes of this invention, a reforming catalyst, particularly a steam reforming catalyst layer can be provided at the oxidation surface of the membrane. A variety of reforming catalysts are known in the art including various metals (e.g., Ni, Ni-based alloys (e.g., Ni—Al or Ni—Cr), Co, Pt, Rh, Ru, Pd and mixtures thereof or noble metals catalysts) on various supports, including, e.g., alkaline metal oxides, alkaline earth metal oxides, silica, titania, zirconia, yttria, and mixtures thereof. Ni (about 5-about 10 weight %) on alumina is a preferred catalyst. Catalysts can also be provided as a separate three-dimensional catalyst (e.g., particles or granules) in close proximity (including in contact with) one or both of the external surfaces of the membrane.

A catalytic membrane reactor of this invention comprises a mixed conducting membrane of this invention separating a reagent zone (where the ion to be transported is formed) and a reactant zone (where the ion transported is released for reaction). In a specific embodiment, the catalytic membrane reactor comprises an oxidation zone in contact with the oxidation surface of the membrane and a reduction zone in contact with the reducing surface of the membrane. In one embodiment where the reactive ions are anions, the reduction zone receives a gas mixture containing source gases for the reactive ion to be generated (i.e., a reagent gas) and the oxidation zone receives the reactant gas (e.g., a reduced gas). In another embodiment where the reactive ions are cations, the oxidation zone receives a gas mixture containing source gases for the reactive ion to be generated (i.e., a reagent gas) and the reduction zone receives the reactant gas (i.e., an oxidized gas). A reactor is also provided with appropriate gas inlets and gas outlets (e.g., a gas manifold) for gas handling, including source and reactant gas delivery and product gas collection. The reactor can also be provided with appropriate heating elements to initially heat the membrane to operating temperature in the range of about 500° C. to about 800° C. The membrane is heated to a temperature that is at least sufficiently high to melt the electrolyte salt in the membrane. Operating temperature may be increased above the salt melting point to ensure efficient operation of the membrane and to optimize oxidation and/or reduction reactions. Operating temperature of the membrane may be, at least in part, maintained by heat released from reactions occurring at the membrane surfaces. The reactor can be formed by of positioning a membrane with appropriate seals between two chambers having appropriate gas inlets and outlets. A reactor contains one or more membranes of the invention and may be comprised of a stack of membranes separated by zones for introduction gases of and/or catalysts.

In a preferred embodiment, the catalytic membrane reactor of this invention is provided with a three-dimensional catalyst in the reagent zone, the reactant zone, or both of the reactor. In a specific embodiment, a three-dimensional catalyst can be provided in the oxidation zone or reduction zone of a reactor in close contact with the oxidation surface or the reduction surface, respectively, of the membrane. In a specific embodiment, for application to the generation of synthesis gas using carbonate mediating membranes, a three-dimensional reforming catalyst is provided in the oxidation zone of the reactor in contact with the oxidation surface of the membrane. For example, a steam reforming catalyst, as is known in the art, can be provided as a three-dimensional catalyst, e.g., as particles or pellets, in the oxidation zone of the reactor in contact with the oxidation surface of the membrane to facilitate synthesis gas production in the catalytic membrane reactor. A reactor of this invention may incorporate both an adherent catalyst layer as well as a three-dimensional catalyst.

In one embodiment, a reactor of this invention is used to separate carbon dioxide from a mixture of gases containing carbon dioxide and oxygen (e.g., air) to generate carbonate ion. This mixture of gases is introduced into the reduction zone of the reactor. The membrane is heated to operating temperatures and carbon dioxide and oxygen are reduced at the reduction surface to form carbonate ion, which is then transported through the membrane to the oxidation surface of the membrane. Carbonate ion transported to the oxidation surface of the membrane during membrane operation can be reacted with one or more gaseous reactants introduced into the oxidation zone. Electrons released at the oxidation surface are transported back across the membrane to maintain charge neutrality. Of particular interest is the use of carbonate to partially oxidize a reduced gas introduced into the oxidation zones. A variety of organic and inorganic species can be oxidized by reaction with carbonate. For example, methane can be partially oxidized to give synthesis gas (a mixture of CO and hydrogen). Alternatively, a variety of hydrocarbons (alkane, alkene, alkynes and aromatics and mixtures thereof) can be partially oxidized at the oxidation surface of the reactor by carbonate anion.

The membranes of this invention containing molten halide, phosphate, sulfate or nitrate salts can be used to form and transport halide, phosphate, sulfate or nitrate ions, respectively. Halide ions formed at the reduction surface in the presence of appropriate source gas(es) and mediated through the membrane can effect a variety of useful reactions, including halogenation. Phosphate ion formed at the reduction surface of the membrane in contact with a gas mixture containing phosphine or phosphorous oxides is transported through a porous matrix/molten phosphate membrane to its oxidizing surface. Phosphate ion can then be employed to react with a variety of chemical species to produce value added product, e.g., organic phosphates. Sulfate ion formed at the reduction surface of the membrane in contact with a gas mixture containing sulfur dioxide and oxygen is transported through a porous matrix/molten sulfate membrane to its oxidizing surface. Sulfate ion can then be employed to react with a variety of chemical species to produce value added products, e.g., organic sulfates. Similarly, nitrate ion formed at the reduction surface of the membrane in contact with a gas mixture containing oxides of nitrogen and oxygen is transported through a porous matrix/molten nitrate membrane to the oxidizing surface. Nitrate ion can then be employed to react with a variety of chemical species to produce value-added products, e.g., organic nitrates Membranes of this invention containing molten ammonium salts ($NH_4^+X^-$ salts, where $X^-$ is an appropriate anion) can be used to form ammonium ions at the oxidation surface of the membrane and transport the ions to the reducing surface of the membrane. The transported ions can with reactant gases, including oxidized gases, to generate value-added products. Ammonium ion can be generated at the oxidation surface by known electrochemical reactions from ion source gases, for example, from ammonia and steam.

BRIEF DESCRIPTION OF THE DRAWINGS

FIGS. 1A and 1B are schematic drawings of membranes of this invention. FIG. 1A illustrates a monolithic membrane with a distribution of pore sizes to achieve a central fine pore region and external coarse pore regions. FIG. 1B illustrates a dual porosity membrane having layers in which a central layer of finer porosity is combined with two bounding layers of coarser porosity.

FIG. 3A is a perspective cut-away view of an exemplary stacked membrane assembly reactor showing a single membrane in place in the stack assembly. FIG. 3B is a top view of a plurality of membranes in the stack assembly of the membrane reactor of FIG. 3A. FIG. 3C is the top view of an alternative single membrane cell element for a stack assembly.

FIG. 5 is a schematic drawing of a membrane reactor of this invention for production of synthesis gas which incorporates a three-dimensional catalyst layer.

DETAILED DESCRIPTION OF THE INVENTION

Figure 1A:
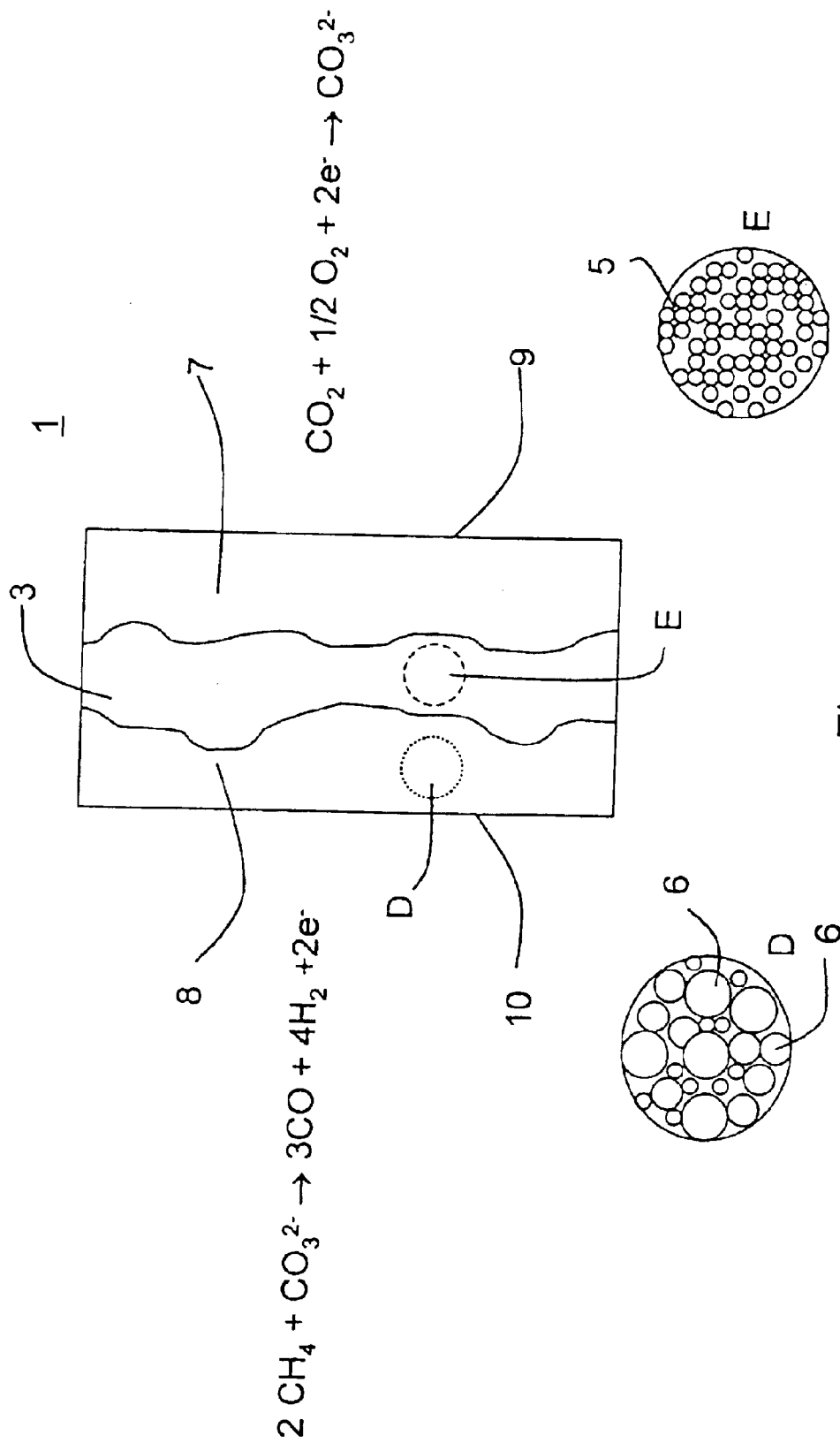

The membranes of this invention are mixed-conducting membranes which conduct ions, such as carbonate, as well as electrons. For example, carbonate ions formed at the reduction surface are transported through the membrane to the oxidation surface and electrons are concomitantly transported through the membrane to the reduction surface to maintain electronic neutrality in the membrane. Alternatively, cations formed at the oxidation surface are transported to the reduction surface and electrons are transported to maintain electronic neutrality. The membrane is formed of a porous electron-conducting matrix at least partially impregnated with an ion-conducting molten salt. The amount of molten salt in the porous matrix is sufficient to provide for transport of a selected ion from one external membrane surface through the membrane to the other external surface. A molten carbonate salt is used, for example, to transport carbonate ions. The mixed-conducting membranes of this invention can be adapted for transport of various anionic species, such as halide ions, including $F^-$, $Cl^-$ and $Br^-$, and various oxide ions, including phosphate ion ($PO_4^{3-}$), sulfate ion ($SO_4^{2-}$) and nitrate ion $NO_3^-$— by appropriate choice of molten salt. i.e. anions of the molten salt comprise the anion to be transported. The mixed-conducting membranes of this invention can be adapted for transport of various cations, e.g., ammonium ion ($NH4+$), again by appropriate choice of molten salt, i.e., cations of the molten salt comprise the cation to be transported.

Membranes of this invention can be constructed to have differential porosity, with a central region of the membrane having sufficiently fine porosity to substantially retain the molten salt electrolyte and external regions on either side of the central region having generally coarser porosity. In the central region, at operating temperatures above the melting point of the salt, substantially all of the pores in the membrane matrix are substantially filled with molten salt. The external or outer regions of the membrane, at operating temperatures, are only partially impregnated with molten salt, but at a level sufficient to maintain a three phase interface region (among reagent or reactant gases, ions and electrons) needed to sustain the reactive chemistry of the membrane.

In the membranes of this invention electron transport is provided by the electron-conducting matrix. The distribution of molten electrolyte within the electron-conducting matrix of the membrane is important to provide required ion paths through the membrane. Molten salt electrolyte should be available at the reaction sites, while not unnecessarily interfering with access of the gaseous reactants to and egress of gaseous products from the reaction sites. In preferred membrane structures, the resistance to ion flow between the catalytic surfaces (e.g., oxidation and reduction surfaces) of the membrane should be minimized. For example, the width of the central fine porosity region can be adjusted to increase ion flow, maintain gas-impermeability of the membrane and provide suitable mechanical strength for the membrane. The electrolyte distribution in the membranes of this invention is controlled by controlling pore size in the membrane matrix and by controlling the amount of molten salt added to the membrane matrix. Ideally the central region of the membrane, which separates the catalytic regions of the membrane, should contain as large a fraction of electrolyte as possible and the ionic path between the catalytic regions should be as short as is practical. The pores in the external regions of the membrane allow access of gases to reaction sites and facilitate three phase interfaces (ions, electrons and reagents or reactants) to facilitate desired membrane reactions. In a preferred embodiment, at least about one-third of the pores in the external membrane regions contain some level of molten salt electrolyte.

Preferably, sufficient molten salt electrolyte is present in the membrane to fill the fine pores and to wet the reactive surfaces, e.g., the oxidation and reduction surfaces. Additional electrolyte may be present to provide a reservoir of electrolyte to compensate for losses during operation. In general, pore size distribution in the matrix and the amount of molten salt electrolyte provided in the membrane are such that there is good contact between the central electrolyte region and the external catalytic surfaces of the membrane. In specific embodiments, the amount of molten salt present in the membrane can preferably represent from about 15% to about 75% and more preferably 20–60% by volume of the membrane.

In general, the thickness, shape, surface area and size of the membrane are selected for a given reactor configuration, reaction chemistry and to provide a balance of reaction efficiency and membrane mechanical strength (to provide increased membrane and reactor operating life). Membranes can, for example, be formed into disks, plates, sheets, or tubes.

In an exemplary embodiment, the matrix of the membranes of this invention has a central fine porosity region with average pore size of less than about 1 micron and preferably with average pore size of less than about 0.5 micron. Fine pores in the central region are preferably uniformly distributed throughout the region to facilitate ion transport. The external membrane regions bounding the central region on either side generally have an average pore size significantly larger (e.g., 2 to 10 times larger) than that of the central region of the membrane. The coarser porosity of these regions allows only partial impregnation with molten salt at operating temperatures. In an exemplary embodiment, the external coarser porosity regions have average pore size greater than about 1 micron, for example in the range of about 2 to about 10 micron, and preferably in the range of about 5–10 micron. These external regions can, for example, have average pore size greater than or equal to about 5 micron. In these external membrane regions, finer pores can be distributed among coarser pores to achieve the desired level of molten salt impregnation. More fine pores may be provided in the external region in proximity to the central region than in the external region further from the central region. For example, fine pores may be distributed in the membrane so that the number of fine pores decreases as distance from the central region increases.

Optimal pore size and pore size distribution in a given membrane can depend upon the type of electron-conducting matrix employed and the type of molten salt employed. Methods are known in the art for making porous materials suitable for use as electron-conducting matrices in the membranes of this invention. Methods are also known in the art for controlling or adjusting average pore size in a variety of materials, including ceramics. For example, methods employed to prepare porous electrodes for use in fuel cells can be employed or readily adapted in preparing the porous electron-conducting matrices of this invention.

In membranes of this invention, surface tension forces ensure that the molten salt is contained within the fine pores of the membrane. As the membrane matrix becomes more porous, there is only partial impregnation of the molten salt. The increased porosity provides a high population of three phase interfaces between reactants, ions (electrolyte) and electrons (electron-conducting matrix). During operation of the membrane of this invention there may be some loss of salt through vaporization.

Membranes of this invention are substantially impermeable to gases, particularly to reagent and reactant gases. Membranes may, however, allow passage of low levels of certain gases, e.g., hydrogen, without substantial loss of function.

Preferred molten salts for use in the membranes of this invention to transport anions are alkali metal salts, alkaline earth metal salts or mixtures thereof, including alkali metal carbonates, alkaline earth metal carbonates and mixtures thereof, alkali metal phosphate, alkaline earth metal phosphates and mixtures thereof and alkali metal nitrates, alkaline cat earth metal nitrates and mixtures thereof. For applications to carbonate ion generation and transport, alkali carbonates are employed. Molten carbonate electrolytes include, among others, mixtures of lithium and potassium carbonate, mixtures of lithium and sodium carbonate and mixtures of lithium, sodium and potassium carbonate. For example, mixtures of 65–40 mol % $Li_2CO_3$ and 35 to 60 mol % $K_2CO_3$ or $Na_2CO_3$, and preferably a 62/38 mol % mixture of $Li_2CO_3$ and $K_2CO_3$ or a 52/48 mol % mixture of $Li_2CO_3$ and $Na_2CO_3$ are useful in molten carbonate membranes of this invention. Ternary mixtures of $Li_2CO_3$, $K_2CO_3$, and $Na_2CO_3$, particularly those in which $Li_2CO_3$ is about 40 to about 65 mol % of the mixture, and more particularly the mixture $Li_2CO_3:K_2CO_3:Na_2CO_3$ (43.5:31.5:25 mol %) are useful in molten carbonate membranes of this invention. For applications to halide ion transport, lithium halide, potassium halide, lithium aluminum halide and mixtures thereof can be used, for example.

Molten salts used in the membranes of this invention are molten at the operating temperatures of the reactor employed. Molten salts used in this invention are substantially thermally or chemically stable under reaction conditions employed in catalytic reactor applications. Some chemical reaction or thermal degradation may occur so long as the functionality of the molten salt for ion transport is not significantly adversely affected or destroyed. Preferred molten salts have melting points less than about 550° C. Molten salts of this invention are typically molten inorganic salts, but they also be salts with organic anions or cations having appropriate melting points, as well as exhibiting thermal and chemical stability under catalytic reactor conditions.

The electron-conducting matrix of the membranes of this invention can be prepared from metal or electron-conducting ceramic. Preferred metals are transition metals or mixtures of transition metals. Nickel is presently preferred for enhanced catalysis. Mixtures of nickel and chromium are preferred to suppress undesired sintering of the matrix, but the catalytic activity of the mixtures is generally lower than that of nickel itself. Metal matrices may be composed at least in part of metal oxides or lithiated metal oxides. Metal matrices may react at least in part during membrane operation to form metal oxides or lithiated or other metal oxides.

A variety of electron-conducting ceramics are known in the art and can be employed in preparing the membranes of this invention. For example, the well-known electron-conducting lanthanum strontium manganates (LSM) (T. Nakanishi (1990) Cerm. Bull. Soc. Jpn. 25:614; S, Otoshi et al. (1991) J. Electrochem. Soc. 138:1519) can be employed to form the membranes of this invention. Preferred electron-conducting ceramics for use in the molten salt ion-conducting membranes of this invention do not substantially conduct ions other than the ion conducted by the molten salt of the membrane.

Methods are known in the art for formation of metal and ceramic matrices with controlled pore size. Methods that have been applied to the preparation of molten salt fuel cells can be adapted without undue experimentation to the preparation of membranes of this invention. Molten salts can be introduced into the electron-conducting matrix in a variety of ways known in the art. In particular, molten salts can be pressed or impregnated into matrices. Molten salt fuel cells are reported in the following U.S. Pat. Nos. 5,983,488; 5,897,972; 5,869,203; 5,595,832; and 4,661,422 and in: Passalacqua et al. (1996) Material Letts. 29:177–183; Shimada et al. (1996) Electrochem. Soc. Jpn. 64 (6): 533–541; Langergren et al. (1998) Electrochimica Acta 44:503–511; Terada et al. (1998) J. Power Sources75:223–229; Murai et al. (1996) J. Electrochem. Soc. 143:2481–2486; Murai et al. (1996) J. Electrochem. Soc. 143:2776–2783; Murai et al. (1996) J. Electrochem. Soc. 143:3456–3462; Biedenkopf et al. (1998) Electrochimica Acta 44:683–692; Ang et al. (1980) J. Electrochem. Soc. 127:1287–1294; Sammells et al. (1980) J. Electrochem. Soc. 127:350–357; Joon, K. (1996) J. Power Sources 61:129–133; Berger et al. (1996) Applied Catalysis A: General 143:343–365; Prins-Jansen et al. (1996) Electrochimica Acta 41:1323–1329; Lee et al (1996) Electrochem. Soc. Jpn 64(6):486–490; Abudula et al. (1996) Solid State Ionics 86–88:1203–1209. Methods provided in these references can be readily adapted for preparation of membranes of the present invention.

FIGS. 1A and B illustrate exemplary membranes of this invention. FIG. 1A illustrates a monolithic porous membrane 1 having a central fine pore region 3 in which substantially all of the fine pores 5 are substantially filled with molten salt, e.g., molten alkali or alkaline earth metal carbonate. Pores 6 generally increase in size in the external catalytic regions 7 and 8 of the membrane, which provide the reducing surface 9 and oxidizing surface 10, respectively, of the membrane. The central region 3 is illustrated in FIG. 1A as having an irregular shape. The central region may have a more regular or uniform shape. Alternatively, the membrane may be formed from an electron-conducting matrix having a high concentration of fine pores at the center with a uniformly decreasing concentration of fine pores and a uniformly increasing concentration of coarser pores as the distance from the center increases.

FIG. 1A also illustrates the reactions that can occur in concomitant $CO_2$ separation, carbonate generation and production of synthesis gas in a membrane reactor of this invention:

throughout, which at membrane operating temperatures, are impregnated with molten salt. The two external layers also have an electron-conducting matrix with coarser pores 25 that are on average significantly larger, e.g., 2–10 fold larger, than those in the central layer. The matrix of the two external layers may be made of the same or different materials. These matrices may be made of materials that are the same as or different from the matrix of the central layer. Most generally the average pore size or the distribution of pores of different sizes in the two external layers may differ. The pores in the external layers are at least partially impregnated with molten salt at membrane operating temperatures (at which the salt is molten). In general and as discussed above, the distribution of pore sizes in the external layers is selected to provide the three phase interface between ions, electrons and reactant gases that facilitates membrane reactions.

Figure 2:
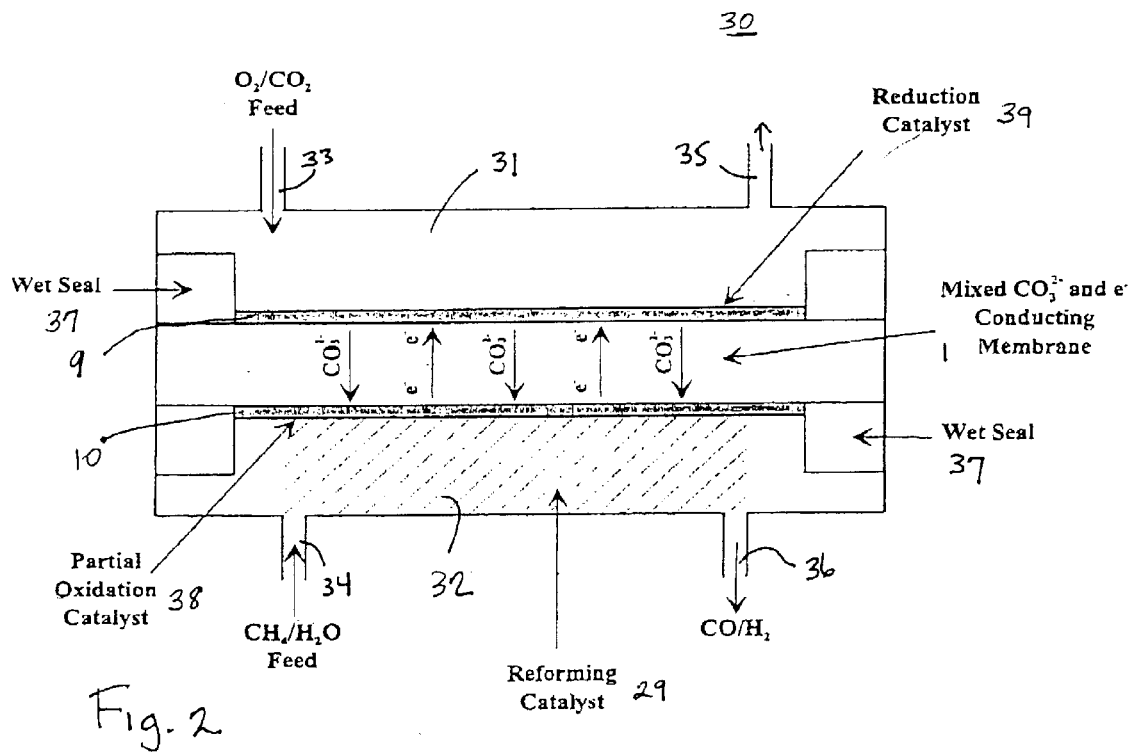
FIG. 2 is a schematic drawing of a membrane reactor of this invention for production of synthesis gas.

FIG. 2 illustrates an exemplary membrane reactor 30 of this invention. The reactor can be employed for carbon dioxide separation as carbonate ion and reaction of carbonate with a reactant gas in the oxidation zone of the reactor, e.g., partial oxidation reactions of the reactant gas. The reactor of FIG. 2 is illustrated for application of the production of synthesis gas by reaction of carbonate with a mixture of methane or natural gas in the presence of steam at least in part by steam reforming. The reactor has a reduction zone 31 and an oxidation zone 32 separated by the mixed conducting molten salt membrane 1. Gas inlets 33 and 34 and gas outlets 35 and 36 are provided for the oxidation and reduction zones of the reactor. The oxidation surface 10 of the membrane is in contact with the oxidation zone and the reducing surface 9 of the membrane is in contact with the reduction zone. The membrane is typically sealed in place in the reactor with a gas-impermeable sealing material 37. The oxidation surface of the membrane is preferably provided with an adherent catalyst 38 that promotes partial oxidation. The reduction surface can optionally be provided with a reduction catalyst 39. The reactor is illustrated with an optional three-dimensional catalyst in the oxidation zone 29. In this case, the three-dimensional catalyst is illustrated as a reforming catalyst. The reactor is provided with a heater and temperature measurement and/or control for heating the membrane (not shown) to operating temperature and maintaining desired operating temperatures. A gas manifold (not shown) may be provided for control of the flow of gas or gases or for providing for

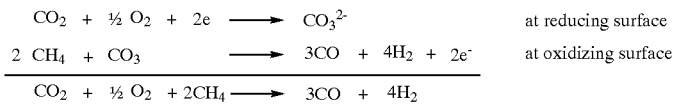

Carbonate ion is generated at reactive sites at the reducing surface of the external region of the porous membrane by reaction of carbon dioxide and oxygen. Carbonate is transported through the membrane facilitated by molten carbonate salt. Carbonate reacts with methane at the oxidizing surface of the membrane to partially oxidize methane to synthesis gas. Electrons released at the oxidizing surface are transported through the membrane via the electron-conducting matrix to maintain charge neutrality.

FIG. 1B illustrates a mixed conducting membrane 1 comprised of multiple layers having different porosity. A central layer 21 is bounded by two external or outside layers (22 and 23). One of the external layers has a reducing surface 9 and the other an oxidizing surface 10. The central layer has an electron-conducting matrix with fine pores 24 mixing of gases in the oxidation and/or reduction zone. Reagent depleted gases, e.g., $CO_2$-depleted gas, exiting the reduction zone may be recycled back into the reactor for further reaction or passed into another reactor. Product gases exiting the oxidation zone that contain unreacted reactant gases, such as methane, may be recycled back into the oxidation zone or passed on to another reactor for further reaction. Synthesis gas product exiting the reactor may be passed into another reactor for a variety of applications that are well known in the art.

Gas containing $CO_2$ and oxygen (reagent gas) is introduced into the reduction zone of the reactor. Carbonate ion is formed at the reducing surface of the membrane and transported to the oxidation surface of the membrane. Reactant gas containing a reduced gas, such as hydrogen, methane, natural gas or other light hydrocarbons (or mixtures thereof is introduced into the oxidation zone where it reacts with carbonate ion. Partially oxidized products are formed and exit the reactor. In particular, when methane and steam are introduced into the oxidation zone and react with carbonate, a mixture of CO and $H_2$, synthesis gas, is produced. It is believed that the following reactions occur:

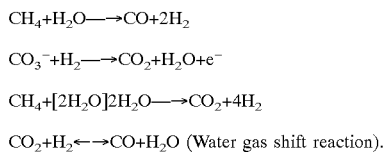

In addition, $CO_3^-$ can react directly to oxidize the hydrocarbon to CO and hydrogen.

Reagent gas (or ion-source gas) is a gas having one or more components at least one of which is used to generate selected ions at one external surface of the membrane. Ions may be generated by the reaction of one or more reagent gas components at the membrane external surface (or in the external regions of the membrane). Reagent gases include sources of ammonium, carbonate, sulfate, halide, phosphate and nitrate ions among others. A source of carbonate can be $CO_2$ and $O_2$. A source of sulfate can be $SO_2$ and $O_2$. A source of nitrate can be NOx and $O_2$. Various volatile halides can provide sources of halide ions. A source of ammonium can be ammonia and steam. A reagent gas can be an oxidized gas or an oxygen-containing gas.

Reactant gas is a gas having one or more components at least one of which reacts with ions transported across a membrane of this invention to an external surface or external region of the membrane. Components of reagent or reactant gases can include any species that is in the gas phase at operating temperatures of the reactor zone. For example, water vapor can be a component of a reagent or reactant gas. Reagent or reactant gases may also contain components that are inert with respect to the chemistry occurring at the external surface and as such function as carrier gases, e.g., nitrogen or inert gases. An oxidized gas is a gas having at least one component which can be reduced on contact with the membrane reducing surface during reactor operation. The term "oxygen-containing gas" refers broadly to any gas containing a species which contains oxygen atoms, including CO, $CO_2$, NOx and SOx. The term also refers to gases that contain $O_2$, such as air. A reduced gas is a gas having at least one component which can be oxidized on contact with the membrane oxidizing surface during reactor operation.

Reactant gases can include "reduced gases" which have at least one component that is capable of being oxidized at the oxidation surface of a reactor of this invention, for example by carbonate ion. Reactant gas components include, but are not limited to methane, natural gas (whose major component is methane), gaseous hydrocarbons including light hydrocarbons (as this term is defined in the chemical arts), alkanes, alkene, alkynes, and aromatic compounds, partially oxidized hydrocarbons such as methanol, higher alcohols (ethanol, etc.), aldehydes, ketones, epoxides and may include organic environmental pollutants. Reactant gases include mixtures of reactant gas components, mixtures of such components with inert gases, or mixtures of such components with CO, $CO_2$ or $H_2O$.

The terms "reactant gas," "ion source gas","carbon dioxide-depleted gas," "oxygen-depleted gas" and "carbon dioxide-containing gas" and any other gas mixtures discussed herein may include materials which are not gases at temperatures below the temperature ranges of the pertinent process of the present invention or at pressures of the membrane reactor, and may include materials which are liquid or solid at room temperature. Gases and gas mixtures employed in the membrane reactor of this invention may include components (because of their nature or concentration level) that do not participate in the reactions mediated by the membrane and which do not detrimentally affect activity of the membrane. Such gases or gas mixtures are inert with respect to the membrane and reacting gases in the reactor.

Various membrane reactor designs are known in the art. U.S. Pat. Nos. 5,817,597; 5,712,220; 5,723,074; 5,580,497 and 5,888,272 provide examples of membrane reactors in which the catalytic membranes of this invention can be used. In general, a plurality of membrane reactors can be provided in series or in parallel (with respect to gas flow through the reactor) to form a multi-membrane reactor to enhance speed or efficiency of reaction.

Figure 3A:
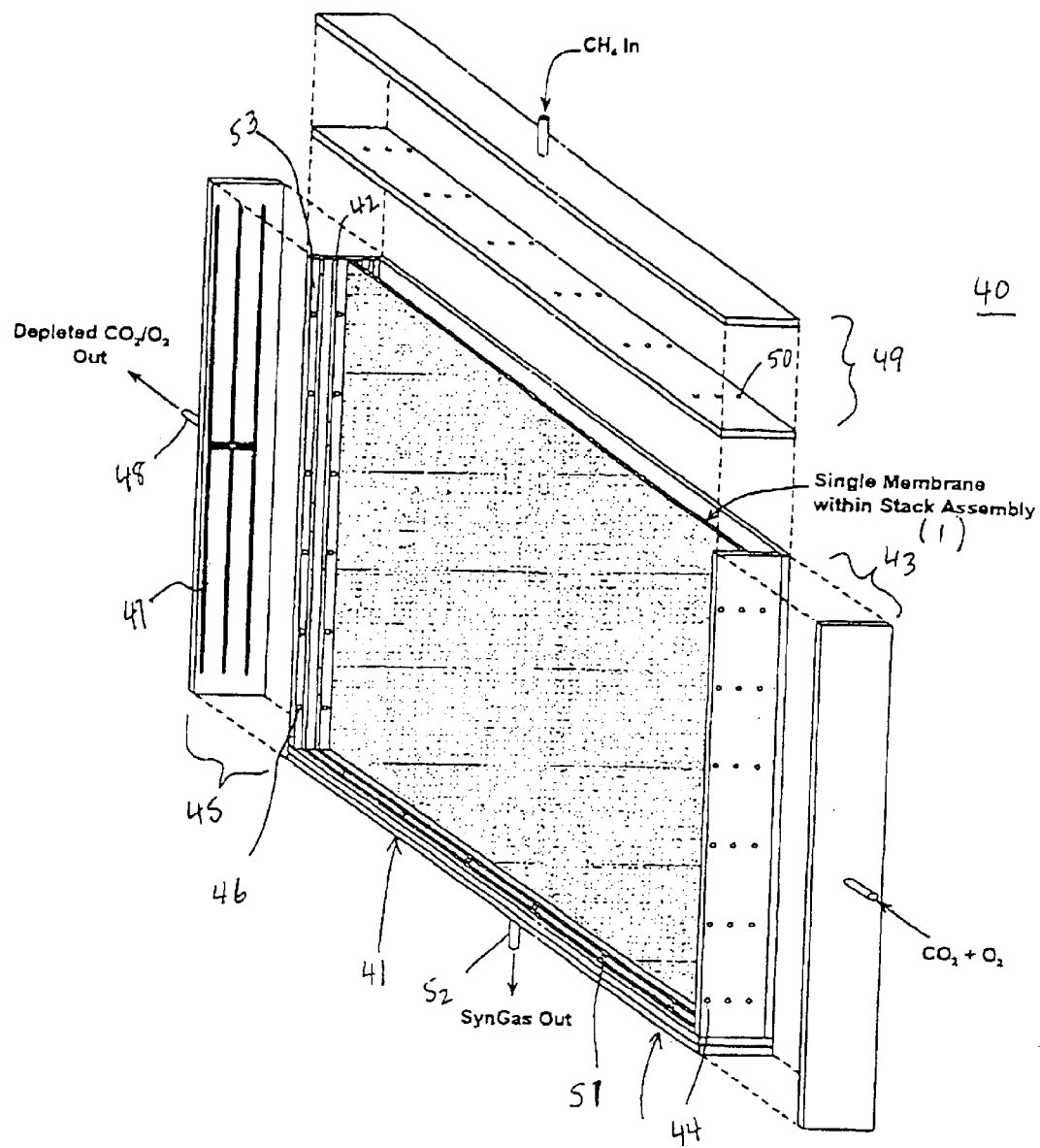
FIGS. 3A and 3B illustrate an exemplary membrane reactor of this invention.

FIG. 3A illustrates an element of a stack assembly membrane reactor which can contain a plurality of membranes 1 of this invention. This reactor can be employed for gas separation and/or reaction of ions transported through the membrane. The reactor 40 is shown with one membrane 1 in place in the stack assembly 41. The reactor stack assembly typically contains a plurality of membranes 1 inserted into spaced slots 42. Gas manifolds (as illustrated in exploded views in the figure) are provided for introduction and exit of gases from the reactor. The reactor is illustrated for production of synthesis gas and has a manifold 43 for introduction of gas containing $CO_2$ and $O_2$, having a plurality of channels (not shown) and appropriately spaced inlets 44 to direct the gas mixture into reduction zones of the reactor. A gas outlet manifold 45 for depleted-$CO_2$ gas is also provided with a plurality of outlets 46 from each oxidation zone and appropriate channels 47 to direct the gas to exit the reactor 48. A gas manifold 49 for introduction of methane (natural gas or other hydrocarbon) and steam, if desired, is also provided through appropriate channels (as illustrated at 47 for the outlet manifold) with a plurality of appropriately spaced inlets 50 to direct the reactant gas into oxidation zones of the reactor. A plurality of product gas outlets 51 to conduct product gases (via channels that are not shown) to the exit 52 of the reactor are also provided. Gas-impermeable seals (not shown) are formed between the assembly frame 53 and each membrane.

Figure 3B:
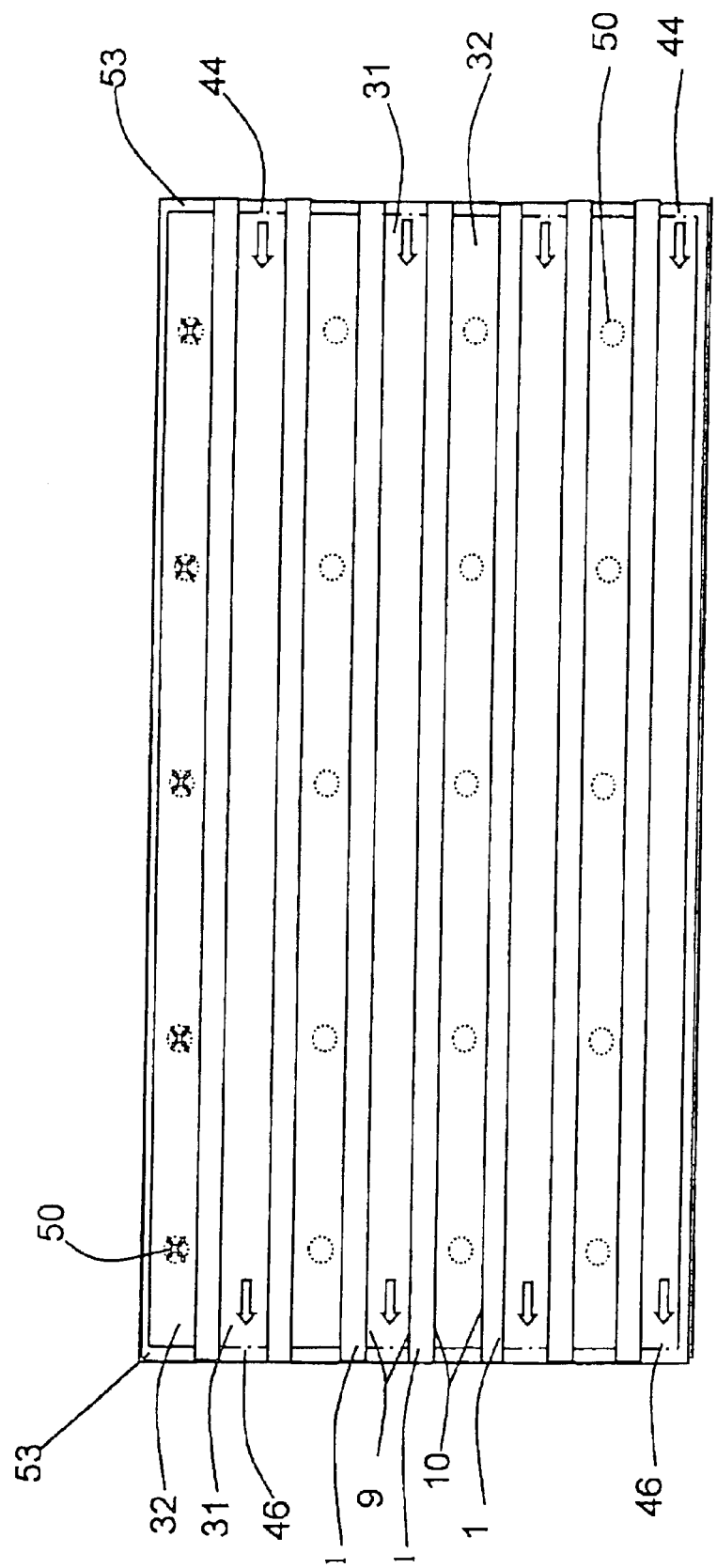

As illustrated in the top view of the stack assembly in FIG. 3B, the areas between the membranes 1 form the oxidation 32 and reduction zones 31 of the reactor. Membranes are inserted into the stack such that like surfaces of sequential membranes in the stack are opposed, e.g., the oxidizing surfaces 10 of two sequential membranes face each other or the reducing surfaces 9 of two sequential membranes face each other. Most oxidation zones are formed between the oxidizing surfaces of two sequential membranes in the stack and most reduction zones are formed between the reducing surfaces of two sequential membranes in the stack. The first oxidation zone and the last reduction zone in the reactor each contact only one membrane oxidizing or reducing surface, respectively. Membrane oxidation surfaces, reduction surfaces or both can be provided with an adherent catalyst, for example the oxidation surface can be provided with an adherent steam reforming catalyst. Gas inlets 50 are positioned above the oxidation zones for introduction of reactant gas (e.g., methane) into the oxidation zones. The "x" in the inlets indicates that reactant gas (methane) flows down into the oxidation zone. Product gas outlets at the bottom of the oxidation zone are not shown. Gas inlets 44 and outlets 46 are positioned on either side of each reduction zone to introduce $CO_2$ and $O_2$ and remove $CO_2$-depleted gas, respectively. Arrows indicate the direction of gas flow in the reduction zone.

FIG. 3C illustrates an alternative membrane cell element for a stacked membrane reactor. The membrane 1 is provided with an adherent oxidation catalyst 55 and an adherent reduction catalyst 56 at the oxidation and reduction surfaces, respectively. Non-conducting separators 57 separate one membrane cell (oxidation zone:membrane: reduction zone) from another. In this case the separators are illustrated as corrugated sheet or plate. The membrane cell element is optionally provided with a three-dimensional catalyst 65 in the oxidation zone.

Membranes of this invention are typically operated at temperatures between about 500° C. to about 800° C., preferably between about 550° C. to about 750° C. and more preferably at about 650° C. Reactors employing the membranes of this invention are preferably operated at 1 atm pressure, but may be operated at higher or lower pressures, if desirable.

The term "gas-impermeable" as applied to membrane of this invention means that the membrane is substantially impervious to the passage of ion-source gases and reactant gases in the reactor. Minor amounts of gases may be transported across the membrane without detriment to the efficiency of the reactor. It may be that membranes of this invention will allow passage of small amounts of low molecular weight gases. The membranes of this invention conduct certain ions and in this sense are permeable to those ions.

Materials employed in the external or outer layers (8 and 7, in FIG. 1A and 22 and 23, in FIG. 1B) of the molten salt membranes (1) can function as catalysts for desired oxidation or reduction reactions. For example, coarse porous nickel or coarse porous nickel oxide in outer membrane layers can function for catalysis. The oxidation surface, the reduction surface or both of the molten salt membranes of this invention can be provided with adherent catalyst layers (e.g., a catalyst coating on the membrane surface or surfaces.) Specifically, the membranes of FIG. 1A or 1B can be provided with adherent catalysts. Catalysts that facilitate desired oxidation reactions can be provided at the oxidation surface, while catalysts that facilitate desired reduction reactions can be provided at the reduction surface. For applications to synthesis gas production, adherent reforming catalysts can be provided on the oxidation surface of the membrane. Reforming catalysts useful in this invention include, among others, $Ni/Al_2O_3$, doped $LaMnO_3$, $MnO_2$ and doped $LaNiO_3$, as are known in the art. Reforming catalysts useful in this invention also include, among others, various metals (e.g., Ni, Ni-based alloys (e.g., Ni—Al or Ni—Cr), Co, Pt, Rh, Ru, Pd and mixtures thereof or noble metals catalysts) on various supports, including e.g., alkaline methal oxides, alkaline earth metal oxides, silica, titania, zirconia, yttria, and mixtures thereof.

An adherent catalyst layer can be selected to promote the formation of a given reactive species for reaction with the reactant gas. Adherent catalysts may also be employed to promote reactions that generate the desired ion for transport across the membrane. For example, the adherent catalyst can be selected to promote the formation of a given reactive oxygen species for oxidation of a reactant gas. Tables 1 and 2 in co-pending U.S. patent application Ser. No. 08/960,182, filed Oct. 29, 1997 and published PCT application WO98/23051 provide a listing of suitable known catalysts with citations to the literature for various hydrocarbon oxidation reactions. Tables 1 and 2 of the co-pending U.S. application are incorporated by reference herein in their entirety and the references cited in these two Tables are incorporated by reference in their entirety herein, to the extent not inconsistent with the disclosure herein, for details of catalyst composition, structure, preparation and reactivity.

Co-pending U.S. patent application Ser. No. 09/960,182, filed Oct. 29, 1997 and published PCT application WO98/23051 describe catalytic membrane reactors incorporating three-dimensional catalysts in the oxidation zone, the reduction zone or both of the reactor. This co-pending application is incorporated by reference herein in its entirety to the extent it is not inconsistent with the disclosures herein for the description of adherent oxidation and reduction catalysts and three-dimensional catalysts in combination with a mixed conduction membrane, particularly for full or partial oxidation reactions. The mixed conducting molten salt membranes of this invention can be employed in catalytic membrane reactors with three-dimensional catalysts as described in the referenced co-pending application. Catalytic membrane reactors of this invention optionally incorporate three-dimensional catalysts optionally in combination with adherent catalyst layers on the membrane surfaces.

Adherent catalysts of this invention can be selected, for example, from mixed ionic and electronic conducting ceramics, cermet catalysts, platinum group of metals (Pt, Pd, Rh, or Ir) on oxide supports, or reforming catalysts as noted above.

Membranes and membrane reactors of this invention can optionally be provided with an adherent or three-dimensional reduction catalyst, such as $La_aSr_{1-a}Co\,O_{3-x}$ where a $\leq 0 \leq 1$ and x is a number such that the compound is charge neutral, a is preferably 0.5 or more, and more preferably, a is 0.7 to 0.9; Ag, Pt or Pd metals (e.g., as metal deposited on the membrane); or catalysts of the formula: $ACo_{1-x}M_xO_{3-\delta}$, where A is Ca, Sr, Ba or combinations thereof, x is a number less than 1 and $\delta$ is a number that renders the catalyst charge neutral. M is a metal ion with empty metal $e_g$ orbitals and filled metal $t_{2g}$ orbitals, with preferred first row transition metal ions being $Fe^{2+}$, $Co^{3+}$ and $Ni^{4+}$.

Catalyst layers or coatings can be introduced onto membrane surfaces by a variety of methods. For example, a slurry of the catalyst powder in an organic solvent can be prepared and coated on to the membrane surface. The thickness of the layer or coating can be adjusted by varying the amount of slurry coated on the membrane or by adjusting the amount of catalyst in the slurry. The coated membrane is annealed at an appropriately high temperature to remove residual solvent.

Preferred reactors of this invention are provided with a three-dimensional catalyst in the oxidation zone in contact with the oxidation surface of the membrane. The three-dimensional catalyst can be provided as a packed-bed, moving-bed, entrained-bed or fluidized-bed catalyst. Dependent upon particular catalyst type, catalyst particles can vary in shape (spherical, irregular, cylindrical, etc.) and vary in size from microns to millimeters in size. Catalysts useful as the three-dimensional catalyst include all of those listed for use as adherent catalyst layers. These catalysts can be readily provided in appropriate form for use as a three-dimensional catalyst, e.g., by coating or impregnation of a support appropriate for use as a three-dimensional catalyst.

A preferred three-dimensional catalyst is a packed-bed catalyst composed of particles of catalyst surrounding the membrane at the oxidation surface. The packed-bed component of the reactor can serve to significantly increase production rates and throughput conversion in a given membrane reaction. By being in close contact with the membrane surface or the adherent layer on the membrane surface, the reactive species at that surface or layer can migrate to this packed-bed yielding a higher surface area for reaction.

The three-dimensional catalyst is selected, as is the adherent layer, to promote the desired oxidation or reduction reaction. An oxidation catalyst can be a metal on an inert oxide catalyst, such as Ni on $Al_2O_3$ or other inert support. Alternatively, an oxidation catalyst can be a metal supported on a mixed ionic and electronic conducting material, such as Ni on $La_{0.8}Sr_{0.2}MnO_3$. The metal can be present in such catalysts from about 1 wt % to about 50 wt %. The catalyst in the packed-bed can comprise the same (or different) catalytic material as any adherent catalyst layer and can be chosen dependent upon application and reaction conditions from the catalysts listed in Tables 1 and 2 that are incorporated by reference from U.S. patent application Ser. No. 09/960,182, filed Oct. 29, 1997 and published PCT application WO98/23051.

Dependent upon the type of reaction catalyzed and materials employed in the reactor, membrane reactors of this invention can be run over a relatively wide range of temperatures from about 500° C. to about 1100° C. The specific temperature and gas flows are optimized for a given reaction and membrane material/catalyst. The temperature must be sufficiently high to facilitate useful ion flux through the membrane without significant decomposition of desired products and without significant damage to the membrane and catalyst materials.

The membranes, optional adherent catalysts, and optional three-dimensional catalysts can be readily adapted to a variety of membrane reactor designs following the guidance provided herein.

Figure 4:
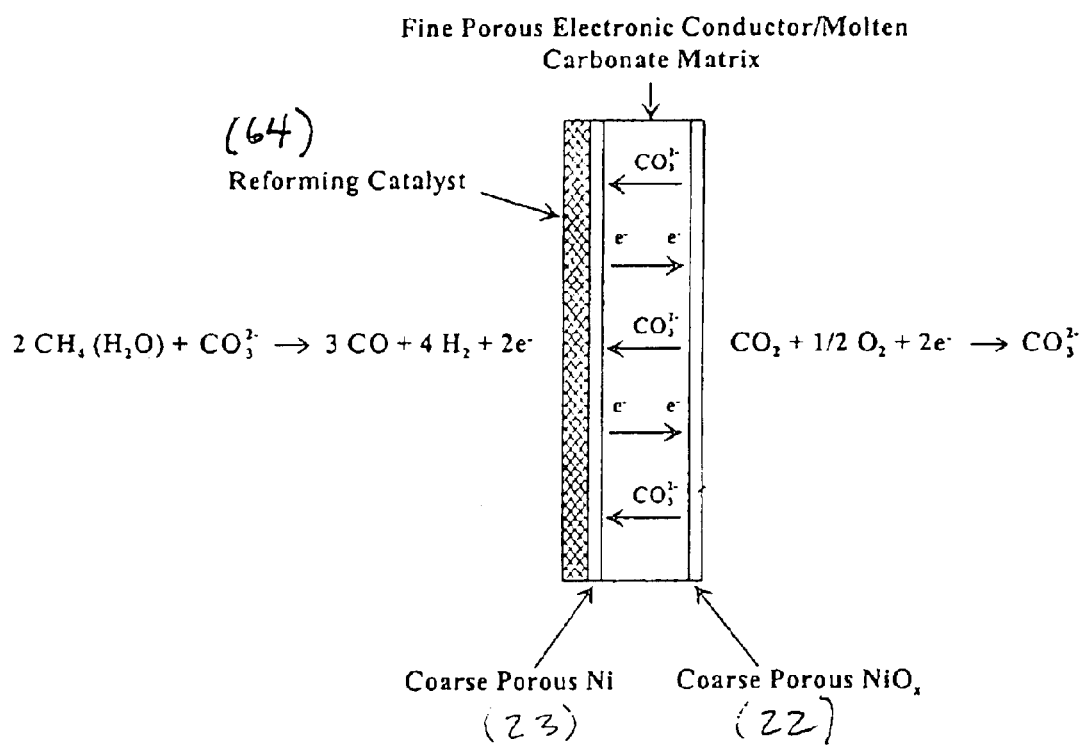
FIG. 4 is a schematic drawing of a membrane of this invention for production of synthesis gas which incorporates an adherent catalyst layer.

FIG. 4 illustrates an exemplary membrane of this invention provided with an adherent catalyst layer (64). The membrane is illustrated as having a molten carbonate matrix for use in selective separation of carbon dioxide and oxygen as carbonate ion and subsequent reaction of the carbonate with methane for formation of synthesis gas. The membrane is illustrated as having external regions 22 and 23 formed of coarse porous material. A steam reforming catalyst, such as Ni supported on alumina, can be provided as the adherent catalyst layer.

FIG. 5A illustrates an exemplary membrane reactor designs employing a molten carbonate salt membrane 1 of this invention and incorporating three-dimensional catalysts 65. The membrane is illustrated as a one-closed-end tube with reagent gas (i.e., ion-source gas, e.g., air) introduced inside the tube in contact with the external membrane surface inside the tube 66 and the reactant gas (methane/steam) introduced in contact with the outer external surface of the tube 67. The outer external surface is provided with an adherent catalyst 68. FIG. 5B is an enlarged view of the interface between the three-dimensional catalyst, adherent catalyst and an external surface of the membrane schematically showing reactive ion $CO_3^{2-}$ interacting with the catalysts.

The reactors of this invention can be employed to carry out a variety of partial oxidation or carboxylation reactions to produce value added products. As exemplified, the reactor can be used to partially oxidize a reduced gas (e.g., methane) or add carboxylate to a reactant gas. Any adherent or three dimensional catalyst employed is selected to facilitate the desired reaction.

In particular, the reactors of this invention are useful for carrying out self-sustaining, exothermic reactions which preferably will not require any external energy source and which preferably can run at 1 atmosphere of pressure. Well-known thermodynamic calculations using standard thermodynamic data and readily available computer programs can be employed to assess the feasibility of a given reaction with carbonate (or other membrane mediated ion, e.g., halide, phosphate, sulfate or nitrate). Membrane operating temperatures and relative ratios of reactants in a given reaction can be readily adjusted to optimize desired reaction.

The following exemplary reactions can be carried out in reactors of this invention employing mixed conducting membranes as described herein:

Natural gas, methane, other lower alkanes and gas mixtures containing methane or lower molecular weight hydrocarbons can be partially oxidized with carbonate to give CO and hydrogen for synthesis gas production.

Alkenes, including those containing more than one double bond can be carboxylated with carbonate anion to yield mono or diacids. Alternatively, alkenes can be reacted with carbonate to yield alkyl carbonates. Dienes, such as butadiene, can be reacted with carbonate to yield cyclic lactones. Organic halides and ketones can be converted into acids by reaction with carbonate. Vinyl carbamates can be prepared by reaction of carbonate with a mixture of an alkyne and a secondary amine. Carbamate esters can be prepared by reaction of carbonate with primary of or secondary amines.

Carbonate esters, such as dimethyl carbonate and diphenyl carbonate, can be prepared by the reaction of carbonate with alcohols. Carbonate esters can also be prepared by reaction of carbonate with epoxides. Polycarbonates can be produced by the reaction of epoxides with carbonate ion.

Phenol and related substituted and non-substituted aromatics can be carboxylated by reaction with carbonate ion.

In each case, the product of reaction with carbonate or other mediated ions is formed in the oxidation zone of the reactor and can be collected or isolated from the product gas stream exiting the reactor by conventional methods well-known in the art.

A Those of ordinary skill in the art will appreciate that methods, materials, and reactants other than those specifically described herein can be employed in the practice of the methods and in the use of the membranes of this invention. All references cited herein are incorporated by reference herein to the extent not inconsistent herewith.

THE EXAMPLES

Example 1

Carbon Dioxide Mediation in a Heterogeneous Carbonate Ion/Electron-Conducting Membrane A three-layer membrane, as illustrated in FIG. 1B, having an internal layer of fine porous nickel impregnated with molten carbonate (a mixture of 62 mol % $Li_2CO_3$ and 38 mol % $K_2CO_3$) and two outer coarse porous nickel layers is prepared by the process described below. The fine porous layer of nickel has an average pore size of 5–125 microns, while the coarse porous layer of nickel has an average pore size of 10–250 microns.

The fine porous nickel layer was prepared by dipping a 200 ppi (pore per inch) reticulated vitreous carbon (RVC) or Ni foam into a NiO slurry. The foam was cut into disk shapes before immersion in the NiO slurry. The slurry was prepared by mixing NiO powder, phosphate ester, polyethylene glycol, polyvinyl butryal and toluene by ball mixing. The sample was then sintered to 1400–1500° C. for 4 h in air and subsequently reduced to Ni metal at 600–675° C. for 2–6 h. The coarse porous nickel layer was made using a similar process, except that 100 ppi foams were used in the process. Molten carbonate was introduced into the fine porous nickel layer by immersing the layer into molten carbonate at 525–500° C. for 1–10 min. Excess molten carbonate was removed from the surface of the sample after cool down. Approximately 0.1 g to 0.8 g of molten carbonate was combined with each gram of nickel in the fine porous layer. A nickel adhesive which can tolerate temperatures up to 650° C. was used to attach the two coarse layers to the fine porous layer. The three-layer membranes prepared in this way ranged in thickness from about 1.5 mm to about 6 mm with internal molten carbonate impregnated layers about 0.5 to 2 mm thick and outer (external) layers about 0.5 to 2 mm thick. All materials employed in the preparation of membranes of this invention are commercially available or can be made through well-known techniques.

An adherent catalyst layer can be applied as a coating on the oxidation surface, the reduction surface or both of the membrane.

In order to measure carbonate mediation, a three-layer membrane prepared as described above, which is about 3 mm thick and about ½" in diameter, is inserted in a membrane reactor as illustrated in FIG. 2. The membrane was sealed in place between an oxidation zone and a reduction zone with the oxidation surface of the membrane in contact with the oxidation zone and the reducing surface of the membrane in contact with the reduction zone. The measurements were performed without additional catalysts. The membranes was heated to an operating temperature of 625° C. and was maintained at that temperature. A flow of air (50 ml/min) and carbon dioxide (20 ml/min)) was introduced into the reduction zone of the reactor and a flow of hydrogen (40 ml/min) was introduced into the oxidation zone. During reactor operation the coarse porous nickel layer in contact with oxygen is at least in part oxidized to NiO.

A $CO_2$ mediation rate of about 10 ml $CO_2/cm^2/min$ was determined by measuring the amount of CO generated in the oxidation zone using gas chromatography and further confirmed by measuring $CO_2$ depletion.

A similarly prepared molten carbonate membrane was employed for synthesis gas production (membrane thickness about 3 mm, fine pore size 5–125 micron, coarse pore size 10–250 micron). The membrane was introduced into the membrane reactor as illustrated in FIG. 2 in which the oxidation surface of the membrane is in proximity to a non-adherent (three-dimensional) steam reforming catalyst, provided as granules (about 2–3 mm in size) in the oxidation zone of the reactor. The steam reforming catalyst used was nickel (5 weight %) supported on alumina. The membrane was heated to 625° C. Humidified methane introduced into the reactor was obtained by bubbling dry methane through a heated water reservoir (50–60° C.).

Those of ordinary skill in the art will appreciate that materials, reagents, reactants, procedures and techniques other than those specifically described can be employed in the practice of this invention. All art-known equivalents of materials, reagents, reactants, procedures and techniques specifically described herein are encompassed by the invention. All references cited herein are incorporated by reference herein to the extent that they are not inconsistent with the disclosure herein.

What is claimed is:

1. A gas-impermeable, mixed electron- and ion-conducting membrane consisting essentially of a porous electron-conducting matrix impregnated with a salt which is molten at membrane operating temperatures which has a central region wherein the porosity is sufficiently fine to substantially retain molten salt in the pores therein, and external regions wherein the porosity is sufficiently greater than in the central region such that the pores in these regions are not substantially filled with molten salt.

2. The membrane of claim 1 wherein a sufficient amount of molten salt is impregnated into the electron-conducting matrix to facilitate ion transport through the membrane.

3. The membrane of claim 1 wherein the electron-conducting matrix is formed from the group of transition metals or mixtures thereof.

4. The membrane of claim 3 wherein the metal is nickel or a mixture of nickel with another transition metal.

5. The mixed conducting membrane of claim 1 wherein the molten salt is a carbonate salt.

6. The mixed conducting membrane of claim 5 wherein the carbonate salt is a alkali metal carbonate, an alkaline earth metal carbonate or mixtures thereof.

7. The mixed conducting membrane of claim 6 wherein the molten carbonate is a lithium carbonate, a potassium carbonate or mixtures thereof.

8. The membrane of claim 1 wherein the electron-conducting matrix is an electron-conducting ceramic.

9. The membrane of claim 1 which comprises a plurality of layers of different porosity.

10. The membrane of claim 1 wherein the external regions comprise a first and a second external region on either side of the central region each external region having an inside surface in contact with the central region and an outside surface forming either a reducing surface or an oxidizing surface of the membrane.

11. The membrane of claim 10 wherein the average pore size in the central region is less than 1 micron and wherein the average pore size in the external regions is greater than 1 micron.

12. The membrane of claim 10 wherein the molten salt is a carbonate, halide, phosphate, sulfate or nitrate salt.

13. The membrane of claim 10 wherein the oxidation surface of the membrane is provided with an adherent oxidation catalyst layer.

14. The membrane of claim 13 wherein the adherent catalyst layer comprises a steam reforming catalyst.

15. The membrane of claim 10 wherein the reduction surface of the membrane is provided with a reduction catalyst.

16. A membrane reactor comprising one or more gas-impermeable, mixed electron- and ion-conducting membranes of claim 10.

17. A membrane reactor comprising one gas-impermeable, mixed electron-and ion-conducting membrane of claim 10.

18. A membrane reactor comprising one or more gas-impermeable, mixed electron- and ion-conducting membranes of claim 1.

19. The membrane reactor of claim 18 for the separation of carbon dioxide from a gas containing carbon dioxide in the presence of oxygen and the partial oxidation of a reactant gas wherein the external regions of the one or more gas-impermeable membranes comprise a first and a second external region on either side of the central region, each external region having an inside surface in contact with the central region and an outside surface forming either a reducing surface or an oxidizing surface of the membrane, and which further comprises:

a reduction zone in contact with a reducing surface of the one or more gas-impermeable membranes for receiving a gas containing carbon dioxide and oxygen; and an oxidation zone in contact with an oxidation surface of the one or more gas-impermeable membranes for receiving a reactant gas wherein the one or more gas-impermeable membranes separate the reduction zone from the oxidation zone and wherein the one or more gas-impermeable membranes transport carbonate.

20. The membrane reactor of claim 19 further comprising an oxidation catalyst in the oxidation zone of the reactor in proximity to the oxidation surface of the membrane.

21. The membrane reactor of claim 20 further comprising a reduction catalyst in the reduction zone of the reactor in proximity to the oxidation surface of the membrane.

22. The membrane reactor of claim 19 which comprises a plurality of gas-impermeable membranes.

23. The membrane reactor of claim 19 wherein the gas containing carbon dioxide and oxygen is air.

24. The membrane reactor of claim 19 wherein the reduced gas comprises methane, a lower hydrocarbon or naphtha.

25. The membrane reactor of claim 19 wherein the reactor further comprises a steam reforming catalyst in the oxidation zone of the reactor.

26. The membrane reactor of claim 25 wherein the steam reforming catalyst is nickel supported on alumina.

27. The membrane reactor of claim 25 wherein the steam reforming catalyst is nickel or a nickel-based alloy supported on alumina, titania, silica or zirconia.

28. The membrane reactor of claim 19 further comprising a three-dimensional catalyst in close proximity to an oxidizing or a reducing surface of the one or more gas-impermeable membranes.

29. The membrane reactor of claim 18 for separating a reactive ion from a source gas wherein the external regions of the one or more gas-impermeable membranes comprise a first and a second external region on either side of the central region, each external region having an inside surface in contact with the central region and an outside surface forming first and second outside surfaces of each of the one or more gas-impermeable membranes, and which further comprises:
a reagent zone in contact with a first outside surface of the one or more gas-impermeable membranes for receiving an ion source gas; and
a reaction zone in contact with a second outside surface of the one or more gas-impermeable membranes for receiving a reactant gas;
wherein the one or more gas-impermeable membranes separate the reagent zone from the reactant zone and wherein the one or more gas-impermeable membranes trnasport the reactive ion.

30. The membrane reactor of claim 29 wherein the reagent zone is an oxidation zone and the reactant zone is a reduction zone.

31. The membrane reactor of claim 30 wherein a three-dimensional catalyst is provided in the oxidation zone, the reduction zone or both.

32. The membrane reactor of claim 29 wherein the reactive ion is a carbonate, a halide, a nitrate, a sulfate, a phosphate or an ammonium ion.

33. The membrane reactor of claim 18 for separating an ionic species from a source gas wherein the external regions of the one or more gas-impermeable membranes comprise a first and a second external region on either side of the central region, each external region having an inside surface in contact with the central region and an outside surface forming first and second outside surfaces of each of the one or more gas-impermeable membranes, and which further comprises:
a reagent zone in contact with a first outside surface of the one or more gas-impermeable membranes for receiving the gas from which the ionic species is formed and wherein the ionic species is formed; and
a reactant zone in contact with a second outside surface of the one or more gas-impermeable membranes for receiving a gas into which the ionic species is transported and wherein the transported ionic species is released wherein the one or more gas-impermeable membranes transport the ionic species to be separated.

34. The membrane reactor of claim 33 wherein the one or more gas impermeable membranes transport an ionic species selected from the group consisting of carbonate, halide, phosphate, sulfate or nitrate ions.

35. The membrane reactor of claim 33 further comprising a three-dimensional catalyst in close proximity to an outside surface of the one or more gas-impermeable membranes.

36. A method for separating an ionic species from an ion source gas which comprises the steps of:
providing a membrane reactor of claim 18 wherein the external regions of the one or more gas-impermeable membranes comprise a first and a second external region on either side of the central region, each external region having an inside surface in contact with the central region and an outside surface forming first and second outside surfaces of the one or more gas-impermeable membranes, and which further comprises:
a reagent zone in contact with one of the first or second outside surfaces of the one or more gas-impermeable membranes for receiving a source gas;
a reaction zone in contact with the other of the first or second outside surfaces of the one or more gas-impermeable membranes oxidation surface wherein the one or more gas-impermeable membranes separate the reagent zone from the reaction zone and wherein the one or more gas-impermeable membranes transport the ionic species;
introducing the ion source gas from which the ionic species is formed into the reagent zone of the reactor;
introducing a gas into which the ionic species is to be transported and released into the reaction zone of the reactor; and
heating the one or more gas-impermeable membranes of the reactor to a temperature such that the ionic species is formed and transported through the one or more gas-impermeable membranes and released into the gas in the reactant zone.

37. The method of claim 36 wherein the ionic species is carbonate.

38. The method of claim 37 wherein the ion source gas is air.

39. The method of claim 36 wherein the ionic species is a reactive ion, wherein the gas introduced into the reaction zone is a reactant gas which undergoes reaction with the reactive ion after the reactive ion is transported through the one or more gas-impermeable membranes, and wherein a product is generated by reaction of the reactive ion with the reactive ion.

40. The method of claim 39 wherein the reactive ion is a reactive cation.

41. The method of claim 39 wherein the reactive ion is a reactive anion.

42. The method of claim 41 wherein the reactive anion is carbonate.

43. The method of claim 42 wherein the ion source gas is air.

44. The method of claim 41 wherein the reactant gas comprises a volatile hydrocarbon.

45. The method of claim 41 wherein the reactant gas comprises methane.

46. The method of claim 39 wherein the ion source gas generates carbonate ions, wherein the reactant gas comprises a volatile hydrocarbon and wherein the product generated is synthesis gas.

47. The method of claim 46 wherein the ion source gas is air.

48. The method of claim 47 wherein the reactant gas is natural gas.

49. The method of claim 41 wherein the reactant gas is a reduced gas that is partially oxidized by reaction with the carbonate ion.

50. The method of claim 49 wherein the reactant gas comprises a hydrocarbon.

51. The method of claim 49 wherein the reactant gas comprises an alkene, an alkyne or an aromatic compound.

52. The method of claim 49 wherein the reactant gas is an epoxide, an aldehyde, a ketone, an alcohol or an amine or mixture thereof.

53. The method of claim 39 wherein the reactive ion is a reactive anion, wherein the reagent zone is a reduction zone, wherein the first outside surface of the one or more gas-impermeable membranes is a reduction surface, wherein the second outside surface of the one or more gas-impermeable membranes is an oxidation surface, wherein the reaction zone is an oxidation zone, wherein the reactive anion is formed at the reduction surface of the one or more gas-impermeable membranes, and is transported through the one or more gas-impermeable membranes to the oxidation surface of the one or more gas-impermeable membranes, and wherein the gas introudced into the oxidation zone is a reduced gas which undergoes reaction with the reactive anion at the oxidation surface of the membrane to generate a product.

54. The method of claim 53 wherein the reactor further comprises an oxidation catalyst in the oxidation zone of the reactor.

55. The method of claim 54 wherein the oxidation catalyst is provided as an adherent layer on the oxidation surface of the one or more gas-impermeable membranes.

56. The method of claim 54 wherein the oxidation catalyst is provided as a three-dimensional catalyst in close proximity to the oxidation surface.

57. The method of claim 53 wherein the ion source gas generates carbonate ions, heating the one or more gas-impermeable membranes generates carbonate ions at the reduction surface of the one or more gas-impermeable membranes and transports carbonate ions through the gas-impermeable membrane to the oxidation surface of the one or more gas-impermeable membranes; and the reduced gas comprises methane or another volatile hydrocarbon which reacts with carbonate ion to produce synthesis gas.

58. The method of claim 57 wherein the ion source gas is a gas containing carbon dioxide and oxygen.

59. The method of claim 58 whererin the ion source gas is air.

60. The method of claim 57 wherein the reduced gas is natural gas.

61. The method of claim 57 wherein the reactant gas further comprises steam and a steam reforming catalyst is provided as an adherent layer on the oxidation surface of the one or more gas-impermeable membranes or as a three-dimensional catalyst in close proximity to the oxidation surface of the one or more gas-impermeable membranes such that reaction proceeds at least in part by steam reforming.

62. The method of claim 53 wherein the reactive ion is carbonate ion and wherein the reduced gas which is partially oxidized by reaction with carbonate ion at the oxidation surface of the one or more gas-impermeable membranes.

63. The method of claim 62 wherein the reactor further comprises an oxidation catalyst in the oxidation zone of the reactor.

64. The method of claim 62 wherein the reduced gas comprises a hydrocarbon.

65. The method of claim 62 wherein the reduced gas comprises an alkene, an alkyne or an aromatic compound.

66. The method of claim 62 wherein the reduced gas is an epoxide, an aldehyde, an alcohol or an amine or mixture thereof.

* * * * *